United States Patent
Peloux et al.

(10) Patent No.: US 9,046,633 B2
(45) Date of Patent: Jun. 2, 2015

(54) TRANSPARENT OPTICAL ELEMENT HAVING A PLURALITY OF LAYERS CONSISTING OF CELLULAR TILING

(75) Inventors: Marius Peloux, Charenton le Pont (FR); Pierre Chavel, Orsay (FR)

(73) Assignees: ESSILOR INTERNATIONAL (COMPAGNIE GENERALE D'OPTIQUE), Charenton le Pont (FR); CENTRE NATIONAL DE LA RECHERCHE SCIENTIFIQUE—CNRS, Paris (FR)

(*) Notice: Subject to any disclaimer, the term of this patent is extended or adjusted under 35 U.S.C. 154(b) by 0 days.

(21) Appl. No.: 14/004,523

(22) PCT Filed: Mar. 8, 2012

(86) PCT No.: PCT/FR2012/050484
§ 371 (c)(1),
(2), (4) Date: Sep. 11, 2013

(87) PCT Pub. No.: WO2012/146843
PCT Pub. Date: Nov. 1, 2012

(65) Prior Publication Data
US 2014/0002911 A1    Jan. 2, 2014

(30) Foreign Application Priority Data

Mar. 16, 2011 (FR) .................................... 11 52134

(51) Int. Cl.
*G02B 3/00* (2006.01)
*G02B 3/08* (2006.01)
(Continued)

(52) U.S. Cl.
CPC .............. *G02B 3/0068* (2013.01); *G02B 3/08* (2013.01); *G02B 3/12* (2013.01); *G02B 26/06* (2013.01);
(Continued)

(58) Field of Classification Search
CPC ............ G02B 3/08; G02B 3/12; G02B 26/06; G02B 3/0068; G02C 7/02; G02C 7/061; G02C 7/083; G02C 7/101
USPC ............... 351/159.01, 159.1, 159.11, 159.62, 351/159.74; 359/741, 742
See application file for complete search history.

(56) References Cited

U.S. PATENT DOCUMENTS

| | | | |
|---|---|---|---|
| 7,423,801 | B2 | 9/2008 | Kaufman et al. |
| 7,808,707 | B2 | 10/2010 | Cano et al. |

(Continued)

FOREIGN PATENT DOCUMENTS

| | | | |
|---|---|---|---|
| FR | 2 872 589 A1 | 1/2006 | |
| FR | 2 879 757 A1 | 6/2006 | |

(Continued)

OTHER PUBLICATIONS

NPL English translation of International Search Report (PCT/ISA/210) for prepared for PCT/FR2012/050484 (Sep. 16, 2013).*

(Continued)

*Primary Examiner* — David N Spector
(74) *Attorney, Agent, or Firm* — Young & Thompson (57) ABSTRACT

A transparent optical element (100), includes a plurality of stacked layers (1, 2), each of which consist of cells in which optical phase-shift values are provided. The layers are arranged such that boundaries between certain contiguous cells of one of the layers cut into cells of another layer. In this way, a useful apparent cell size can be reduced so as to reproduce a target optical phase-shift distribution with greater precision. Additionally, the maximum amplitude of optical phase shift variations that are produced by the element increases with the number of stacked layers. The chromatism of the diopter function of the element can also be reduced.

20 Claims, 4 Drawing Sheets (51) Int. Cl.
*G02B 3/12* (2006.01)
*G02B 26/06* (2006.01)
*G02C 7/02* (2006.01)
*G02C 7/06* (2006.01)
*G02C 7/08* (2006.01)
*G02C 7/10* (2006.01)

(52) U.S. Cl.
CPC *G02C 7/02* (2013.01); *G02C 7/061* (2013.01); *G02C 7/083* (2013.01); *G02C 7/101* (2013.01); *G02C 2202/18* (2013.01)

(56) References Cited

U.S. PATENT DOCUMENTS

| | | |
|---|---|---|
| 7,828,430 B2 | 11/2010 | Ballet et al. |
| 7,891,809 B2 | 2/2011 | Ballet et al. |
| 8,052,278 B2 | 11/2011 | Bovet et al. |
| 8,079,702 B2 | 12/2011 | Ballet et al. |
| 8,092,017 B2 | 1/2012 | Cano et al. |
| 8,172,397 B2 | 5/2012 | Ballet et al. |
| 8,231,217 B2 | 7/2012 | Ballet et al. |
| 2008/0212023 A1 | 9/2008 | Bovet et al. |
| 2009/0316110 A1 | 12/2009 | Cano et al. |
| 2013/0069258 A1 | 3/2013 | Ballet et al. |

FOREIGN PATENT DOCUMENTS

| | | |
|---|---|---|
| FR | 2 879 758 A1 | 6/2006 |
| WO | 2004/008189 A1 | 1/2004 |
| WO | 2004/049044 A2 | 6/2004 |
| WO | 2006/092804 A2 | 9/2006 |

OTHER PUBLICATIONS

International Search Report, dated Jun. 26, 2012, from corresponds to PCT application.

* cited by examiner

TRANSPARENT OPTICAL ELEMENT HAVING A PLURALITY OF LAYERS CONSISTING OF CELLULAR TILING

BACKGROUND OF THE INVENTION

1. Field of the Invention

The present invention relates to a transparent optical element comprising a plurality of layers that consist of respective cellular tilings.

2. Description of the Related Art

In the context of the present description, the expression "transparent optical element" is understood to mean a component that is intended to form an image of a scene from light that originates from this scene and that passes through the element. For example, it could be an optical lens, an ophthalmic lens such as a spectacle glass or a contact lens, or an ocular implant, etc. Optionally, such an element may possess a Fresnel structure in order to increase the optical power obtainable with regard to constraints related to the production process of the element, to its thickness, to the material used, etc.

Although such a transparent optical element may possess various additional optical functions such as providing an absorbing power, a polarizing power, or increasing contrast, etc., its image-forming function may be characterized by a distribution of an optical phase shift that the element produces, in a defined area, for a given monochromatic light wave that passes through the element. Generally, the transparent optical element possesses a useful area that extends transversely relative to an optical axis. An average direction of propagation of the light wave may then be chosen to be superposed on this axis, and the distribution of the optical phase shift may be determined inside the useful area of the element.

It is known that such transparent optical elements may be digital in nature, or pixelated. In this case, the optical phase shift possesses discrete values that are produced at points representing a sampling of the useful area of the transparent optical element. Simplistically, the optical phase shift could be constant in a limited zone, commonly called a cell, around each sampling point. The value of the optical phase shift of the element at every point in any given cell would therefore be equal to that of the sampling point located in this cell. More realistically, the phase shift is not constant inside each cell, but is intermediate between minimum and maximum values that are fixed by a target phase shift function for this cell. The cells are contiguous in the useful area of the optical element, and form a tiling in this area. The actual refractive function of the digital transparent optical element then results from the combination of this tiling with the optical phase shift values that are obtained in all the cells.

It is also known that the optical phase shift $\Delta\phi$, for a monochromatic light wave is equal to the product of two times the number pi, and of the distance H traveled through each cell, and of the difference between the value n of the refractive index of the transparent material that fills this cell and the value of the index of air. In other words: $\Delta\phi = 2\pi \cdot H \cdot (n-1)/\lambda$, where $\lambda$ represents the wavelength of the light. A first possible way of producing the transparent optical element thus consists in varying the value of the refractive index of the material filling the cells, between the different cells of the element. In this case, all the cells may have the same depth, which is measured along the optical axis of the element. Another possible way of producing the transparent optical element consists in producing cells of variable depth, using the same transparent homogenous material to fill all the cells. For example, the optical element may consist of a transparent, optionally curved, homogenous sheet that has a variable stepped thickness. For this reason, at least one of the faces of the sheet may possess sagittal height values that vary between different cells of the tiling of this face.

However, a digital transparent optical element generally has the following drawbacks:

the individual cells in which the optical phase shift is capable of taking different values have a minimum size, which is in general set by the technology used to manufacture the element. This minimum size spatially limits the sampling of a distribution function of the optical phase shift, which function is used as a target to produce a desired refractive function. In other words, the actual distribution function of the optical phase shift for the digital element only approximately reproduces the target distribution function. The difference between these two distribution functions is a shortcoming in the refractive function that is actually produced by the optical element. Such is especially the case when the target distribution function is continuous, or continuous inside portions of the useful area of the element;

the number of different discrete values that are obtainable for the optical phase shift in each cell is also limited. For example, only 16 to 128 different values are obtainable. Because of this limited number of possible values, a difference may exist between the value of the optical phase shift produced for each of the sampling points of the digital optical element and the value of the target distribution function for the same point. This limitation in the number of different values that may be obtained for the optical phase shift inside each cell is different from the limitation that results from the minimum size of the cells. However, it also contributes to the difference between the actual distribution function of the optical phase shift of the digital element and the target distribution function;

the range of values that are possible for the optical phase shift in each cell of the element is itself limited. In other words, the optical phase shifts that can be produced in the cells of the element are bounded by a minimum value and a maximum value. These minimum and maximum values are also a result of the technology used to manufacture the element. However, the apparent range of values for the optical phase shift is commonly increased by employing phase jumps that are multiples of two times pi for a given wavelength called the nominal wavelength. This nominal wavelength may, for example, be about 550 nm (nanometers). However, a chromatic aberration results therefrom for the refractive function that is actually produced by the element, above all when the amplitude of each phase jump is equal to a small even integer number times pi. Such a chromatic aberration is then disadvantageous in many applications; and discontinuities in the optical phase shift at the boundaries separating contiguous cells of the tiling on the surface of the digital optical element scatter part of the incident light wave. In other words, a fraction of the energy of this light wave is not simply transmitted by the element in accordance with its optical phase shift distribution function, but the propagation direction is in addition deviated laterally. This scattered part of the wave then forms a luminous background that decreases the contrast of the image that is formed by the optical element. This decrease in contrast may be considered as a decrease in the transparency of the element. When the network of the boundaries separating cells of the tiling is periodic, the scattered part of the incident wave may form parasitic images or be concentrated in privileged diffraction directions, which are also liable to disadvantage use of the optical element.

SUMMARY OF THE INVENTION

Under these conditions, the present invention aims to ameliorate or obviate at least certain of the above drawbacks.

More particularly, a first aim of the invention consists in providing a cellular transparent optical element that enables the difference between its optical phase shift distribution function and a target distribution function to be decreased, the latter distribution possibly being continuous or continuous in portions.

A second aim of the invention consists in providing a cellular transparent optical element that has a smaller chromatic aberration, especially a smaller axial chromatic aberration.

To achieve these and other aims the invention provides a transparent optical element that comprises a plurality of layers superposed along an optical axis of the element. Each layer extends perpendicularly to the optical axis and consists of a tiling of contiguous cells. For each layer, a distribution function of an optical phase shift possesses a constant value inside each cell of this layer. The refractive function of the element thus results from a combination of the respective optical phase shift distribution functions of the layers.

Thus, the transparent optical element of the invention may be a digital element.

The element is characterized in that the tilings of at least two of the layers do not coincide in a projection of these layers onto a surface perpendicular to the optical axis, so that the boundaries between some of the contiguous cells of one of the two layers cut some cells of the other of the two layers in said projection.

Thus, on the projection surface, the cells of one of the layers are themselves divided by the intercellular boundaries of the other layer. The superposition of the two layers then appears to be divided into useful cells that have dimensions that are smaller than or equal to those of the cells of each layer. In other words, the superposition of layers according to the invention makes it possible to decrease an apparent useful cell size in order to produce a given refractive function. For this reason, the difference between the distribution function of the optical phase shift of the element of the invention and a target distribution function, especially a target distribution function that is continuous or continuous in portions, may be decreased. This has the effect of decreasing the intensity of the parasitic light that is diffracted and of better distributing it angularly. This parasitic light is then less perceptible.

Furthermore, the number of possible values for the total optical phase shift of the element results from a combination of the values that can be produced for each of the layers. It is therefore higher than the number of values possible for each layer. Therefore, for this reason also, it is possible to reproduce more precisely a target optical phase shift distribution function with a transparent optical element according to the invention.

Simultaneously, the range of total optical phase shift values that are possible for the transparent optical element of the invention results from a juxtaposition of the corresponding ranges for all the layers. It is therefore wider than the latter, and makes it possible to avoid having to use phase jumps having amplitudes of small integer numbers of two times pi, for a nominal wavelength. The chromatic aberration of the refractive function of the transparent optical element of the invention may thus be decreased.

In various embodiments of the invention, one or more of the following improvements may be applied, whether alone or in combination:

the respective tilings of the layers, which do not coincide on the projection surface, may be identical but offset one relative to the other by a translation, by a rotation, or by a combination of a translation and a rotation;

at least one of the respective tilings of the layers, which do not coincide on the projection surface, may be random or pseudo-random. Optionally, one of the tilings of the element may be random or pseudo-random while another tiling of the same element may be periodic or regular;

when the tilings, which do not coincide on the projection surface, are offset one relative to the other by a translation or by a combination of a translation and a rotation, and when these tilings are each periodic with a common period in at least one period direction associated with each layer, a length of the translation in the period direction of one of these layers may lie between 25% and 75% of the common period, in addition to an integer number of times the common period. Preferably, the translation length may lie between 25% and 75% of the common period;

more generally, the transparent optical element may comprise N layers the tilings of which are identical, but each of which tilings is offset by a translation or by a combination of a translation and a rotation relative to one of these N tilings, which is taken as a reference, N being an integer number greater than or equal to two. The N tilings may each be periodic with a common period a in at least one period direction that is associated with each layer. In this case, a length of the translation of the tiling of each of the N layers relative to the reference tiling, in the period direction of the reference tiling, may lie between 25% and 75% of $i \cdot a/N$ in addition to an integer number of times the common period, where i is a natural integer numbering the N layers having identical tilings, with i ranging from 0 to N−1 and i being zero for the layer of the reference tiling;

the tiling period that is common to the layers having identical tilings may lie between 3 µm (microns) and 1 mm (millimeter);

the respective optical phase shift distribution functions of the layers having identical tilings may themselves be identical except for the respective translations, rotations or combinations of translations and rotations of these layers; and the refractive function of the element may be invariant in rotation about its optical axis, except for residual variations due to a discretization of the values of the distribution functions of the optical phase shift.

The transparent optical element of the invention may form an optical lens, in particular an ophthalmic lens, and especially a spectacle glass.

Moreover, the optical phase shift values that are produced by each layer may result from variations in a refractive index of a transparent material from which this layer is formed, between different cells. Alternatively, the optical phase shift values that are produced by each layer may be the result of variations in depth or height between different cells of this layer. They may also result from combined variations in both refractive index and depth between different cells inside a given layer.

Optionally, contiguous cells in a given layer may be separated from one another by intercellular walls. Such walls may prevent compounds that are initially contained in the different cells from mixing. In addition, the intercellular walls may act as a spacer between a base film and a film closing the layer in question, which films are located on either side of the cells.

BRIEF DESCRIPTION OF THE DRAWING FIGURES

Other features and advantages of the present invention will become apparent from the following description of nonlimiting example embodiments, given with reference to the appended drawings, in which.

For the sake of clarity, the dimensions of the elements that are shown in these figures do not correspond to their actual dimensions and the ratios of these dimensions are not the actual ratios. Furthermore, identical references that feature in different figures denote identical elements or elements that have identical functions.

DETAILED DESCRIPTION OF THE INVENTION

Figure 1:
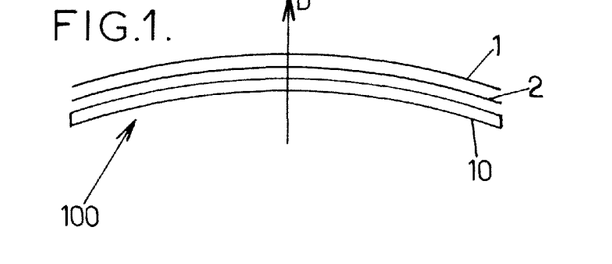
FIG. 1 is a cross-sectional view of an optical element according to the invention.

As shown in FIG. 1, a transparent optical element 100, which may be a spectacle glass, comprises a substrate 10 and at least two layers 1 and 2 that are superposed on one face of the substrate 10. The substrate 10 may itself be a spectacle glass, the layers 1 and 2 being applied and permanently fastened to the substrate 10 in a way that is known in the art and not described here. For example, intermediate films of adhesive material may be used to fasten the layer 1 to the layer 2, on the one hand, and the array of layers 1 and 2 to the substrate 10, on the other hand.

The substrate 10 has a refractive function, which may be characterized by a distribution of the optical power and astigmatism values that are produced at various points in its useful optical area. Each of the layers 1 and 2 may then be intended to modify these values by producing locally an additional optical phase shift for a light wave that passes through the element 100. This optical phase shift, which is produced by each layer 1, 2, varies depending on the point at which each light ray passes through the useful area of the element 100.

It is also possible for the substrate 10 to have no refractive function itself, but only the function of supporting the layers 1 and 2. In this case, the latter alone provide the element 100 with its final refractive function.

Lastly, the substrate 10 is optional when the layers 1 and 2 are sufficiently stiff or indeed are adequately held, for example by being fixed into a frame via their peripheral edge.

The layers 1 and 2 are superposed in a stacking direction that is denoted D. They are parallel to each other, and may optionally have a common curved shape.

In any case, the stack of layers 1 and 2, or optionally of a number of layers greater than two, is designed to produce a refractive function for a monochromatic wave that passes through the layers in the direction D. D may then correspond to an optical axis of the element 100.

Each layer of an element according to the invention may have a structure that is identical or different to that of another layer in the same element.

Figures 2A, 2B, 3A, 3B:
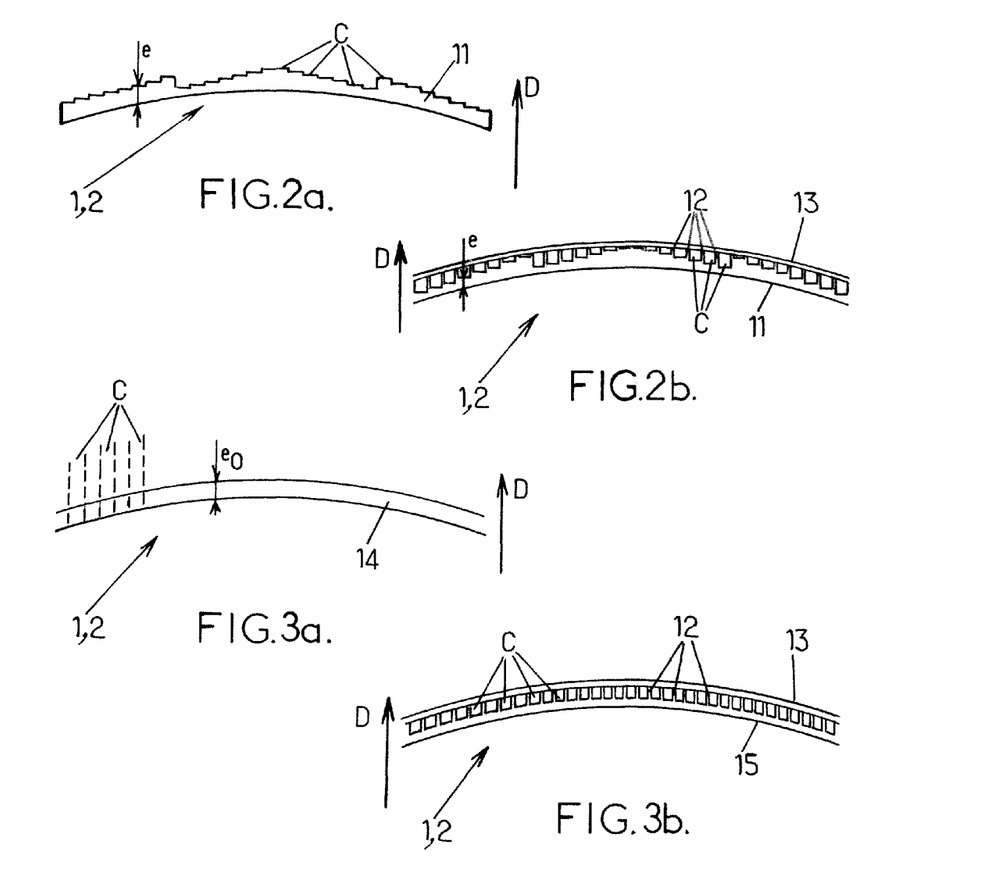
FIGS. 2a and 2b are cross-sectional views of layers that may be used in the optical element in FIG. 1.
FIGS. 3a and 3b are cross-sectional views of other layers that may be used in the optical element in FIG. 1.

FIGS. 2a and 2b show first possible layer structures, for which the variable optical phase shift is obtained by varying a local thickness of the layer. For example, in FIG. 2a, the layer 1 or 2 consists of a transparent film 11 the thickness e of which varies between different zones that are defined on one of the faces of the film. Such thickness variations may be obtained by laser ablation, i.e. by locally ablating a given part of the material of the film by means of a laser beam. Alternatively, these thickness variations may also be obtained by photolithography. For a layer such as the one considered in the present invention, the optical phase shift produced by said layer is constant inside juxtaposed zones, these zones being called cells, and denoted by the letter C in the figures. The cells C together cover the layer, or a useful part of the latter, and form a tiling. The value of the optical phase shift in a given cell C is then fixed by the residual thickness of the layer 11 in this cell. Most often, this value is selected from a finite number of possible values, which are set by the process used to produce the local variation in the thickness of the film 11. For example, the laser beam which is used to ablate the surface of the film may be pulsed, each pulse having the same energy, the thickness of the film then being controlled by tailoring the number of laser pulses that are directed toward a cell location.

FIG. 2b shows a layer structure equivalent to that in FIG. 2a, in which neighboring cells C are separated by a wall 12 that extends perpendicularly to the layer. The variable thickness e of the film 11 is obtained by varying a depth of the cells C, which depth is measured in the direction D. The thickness of the separating walls 12, measured parallel to the layer, may be neglected in a first approach to the invention. Preferably, the tops of the walls 12 are located at the same common level in the direction D. They can then support a closing film 13, thereby preventing dirt from filling the cells C and modifying the depth distribution relative to the layer as initially manufactured.

FIGS. 3a and 3b show other possible layer structures in which the variable optical phase shift is obtained by locally modifying a value of the light refractive index of a constituent material of the layer. All the cells C may then have an identical depth. For example, in FIG. 3a, the layer 1, 2 is made from a film 14 having a thickness $e_0$, that is constant between any locations on this film. This film 14 contains a photoactive material that is such that the value of its light refractive index can be modified via local irradiation, for example by means of a laser beam. Sweeping the surface of the film 14 with a laser spot while simultaneously varying the intensity or the number of laser pulses delivered between different points allows the value of the refractive index in the cells C to be adjusted. Typically, the maximum difference in the refractive index values that can be obtained in this way is about 0.1 or 0.15.

Lastly, FIG. 3b shows a layer structure that is equivalent to that in FIG. 3a, but in which neighboring cells are separated by walls 12. Thus, separate portions of the photoactive material are respectively contained in partitioned cells C, and each of the cells may be irradiated separately in order to adjust its light refractive index value. To do this, the cells C may initially be formed on the surface of a base film 15, then filled with the photoactive material, irradiated one by one, then collectively closed by a film 13 on a side opposite the base film 15. When the cells C are thus isolated from one another by the walls 12, an alternative method for varying the refractive index value of the material that is contained in each cell consists in using, for this material, a mixture of a plurality of compounds. These various compounds have respective index values that are different, and intermediate values are obtained by varying the proportions of the mixture. In this case, the number of obtainable values is limited by the minimum amount of each compound that can be controllably introduced into each cell. Typically, sixteen to one hundred and twenty eight different values can be obtained in this way for the refractive index in the cells C.

Alternatively, layer structures other than those described above may be used. In particular, mixed structures may be implemented, in which the variations in optical phase shift are obtained both by variations in thickness and by variations in the refractive index of portions of transparent materials contained in the cells.

Furthermore, within a given optical element according to the invention, the layers may have respective structures that are different.

Figure 4A:
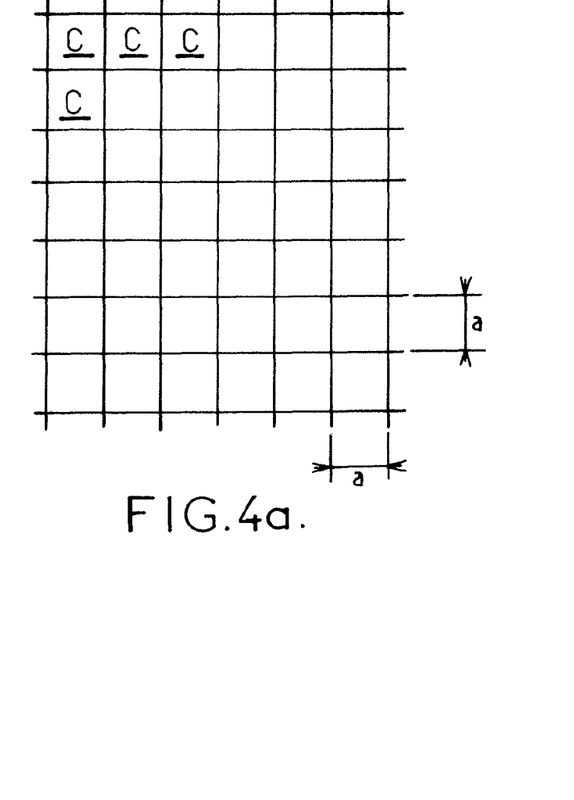
FIGS. 4a and 4b show possible tilings for the layers used in the optical element in FIG. 1.
Figure 4B:
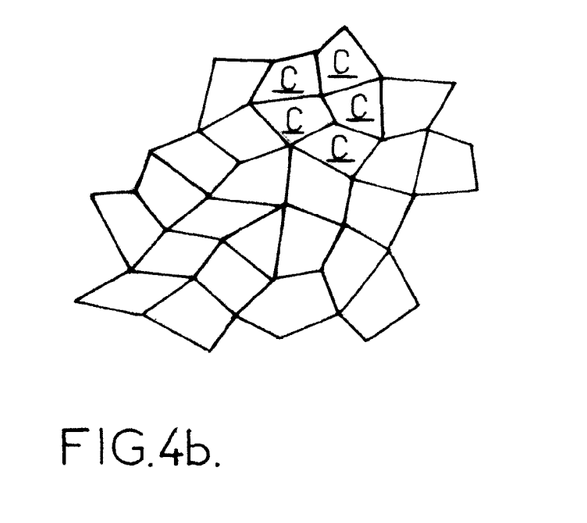

FIGS. 4a and 4b show two different tilings that may be used to form the cells C inside each layer. Such tilings may be regular and especially periodic in at least one direction parallel to the layer. For example, the tiling may have a square pattern of side length a (FIG. 4a), a triangular pattern, a hexagonal pattern, etc. Alternatively, the tiling may be random or pseudo-random (FIG. 4b). In the context of the present description, the expression "pseudo-random tiling" is understood to mean a cellular distribution that is defined using a construction algorithm designed to produce an apparently random tiling. In particular, such a pseudo-random tiling may be obtained by fixing an initial distribution of cell centers in a layer, then by constructing the boundaries between neighboring cells using what is called the Voronoï method. Optionally, such a construction may be restarted by moving at least certain of the cell centers, in order to increase the disorder in the cellular tiling finally obtained. Within a given optical element according to the invention, the layers may have different respective tilings.

By way of illustration, the cells C may have dimensions that are about a few microns to several hundreds of microns in size, parallel to the layer in question. Their depth, parallel to the direction D, may be between 1 and 50 µm, and for example equal to about 20 µm.

Each layer is said to be digital when the optical phase shift that is produced by said layer has values respectively dedicated to the cells of the tiling, these values possibly changing from one cell to the next, and when these values are restricted to a set of discrete values that are determined beforehand. Such is especially the case when the optical phase shift is adjusted using a process that is itself digital. Such a digital layer is only able to approximate the target continuous distribution function of the optical phase shift. The use, according to the invention, of at least two layers having tilings that do not coincide allows the difference between the actual distribution of the optical phase shift that is produced by the superposition of the layers, and the target distribution, to be decreased. Such a target continuous distribution may correspond to the refractive function of a unifocal spectacle glass, for example, or to the refractive function of a progressive spectacle glass. Optionally, the target distribution function of the optical phase shift may be continuous inside separate portions of the useful area of the element 100, and discontinuous at the boundary between two areal portions. Such is especially the case when the target distribution function corresponds to the refractive effect of a Fresnel lens. Generally, the target distribution function may be any function. In particular, it may have no symmetry of revolution about the optical axis of the element.

The difference between the actual distribution function of the optical phase shift for an element produced according to the invention and its target distribution function may be estimated in various ways.

A first method is suitable for demonstrating luminous interference effects that the optical element could produce, and that would be liable to decrease image contrast. This first method consists in comparing, in a selected plane downstream of the optical element, the illumination produced, for an incident monochromatic wave, by the optical element of the invention and by a reference optical element, respectively. The integration plane will sensibly be chosen to be a focal plane of the emergent wave. Directions in which the optical element may diffract light with significant intensities may be established with this first method. Depending on the circumstances, it may be advantageous to deflect the diffraction directions, and a scattering halo, relative to the image direction, and thus decrease the diffraction and scattering intensities.

A second method of estimating the difference, which is commonly called Maréchal's criterion, consists in integrating, in a reference plane that is located downstream of the optical element, for an incident monochromatic wave that passes through said element, the square of the difference between the phases of the emergent wave for the actual distribution function and for the target distribution function of the optical phase shift, respectively. In particular, the integration plane may be located on the exit face of the optical element. Such a second method is particularly suitable for demonstrating the amount of error associated with an actual phase shift, during design of a digital glass.

A first example embodiment of the invention, in which the optical element 100 comprises two layers 1 and 2 having identical square tilings of pitch denoted a and equal to 200 µm, is now described with reference to FIG. 5a. The respective tilings of the layers 1 and 2 are offset by translating one relative to the other along half the length of the diagonal of the square cells. In other words, the tiling of the layer 2 is simultaneously translated by a/2 along the two directions of the sides of the square cells C, relative to the tiling of the layer 1.

The two layers 1 and 2 are digital layers that are produced using the same digital technology to adjust the optical phase shift in each cell C. The optical phase shift distribution of each of the layers 1, 2 is optimized to reproduce the target continuous distribution of a convergent unifocal lens having a focal length of 2 m (meters). Under these conditions, the transparent optical element 100 is a digital version of a convergent unifocal lens with a focal length equal to 1 m.

Figure 5A:
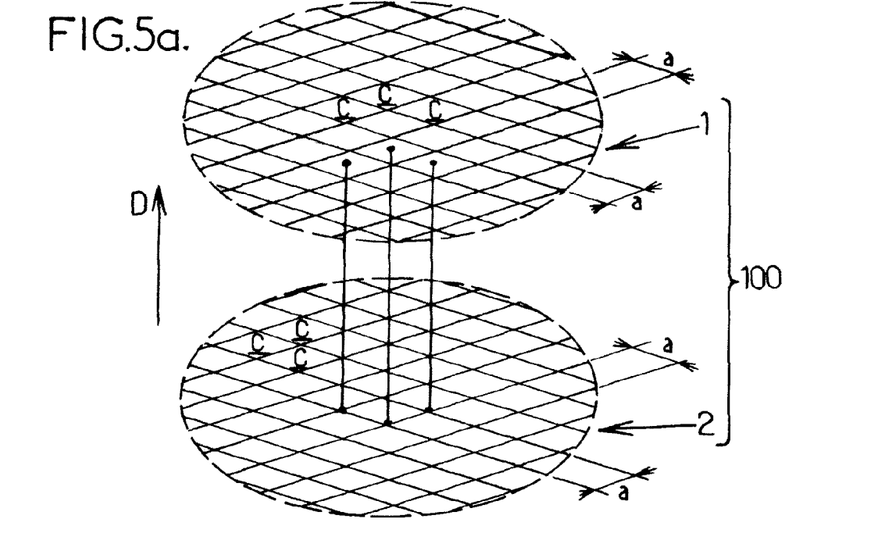
FIG. 5a illustrates a first embodiment of the invention.
Figure 5B:
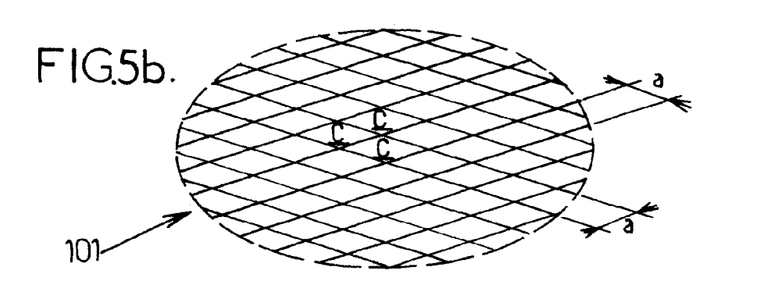
FIGS. 5b and 5c illustrate two transparent optical elements known from the prior art, mentioned by way of comparison.
Figure 5C:
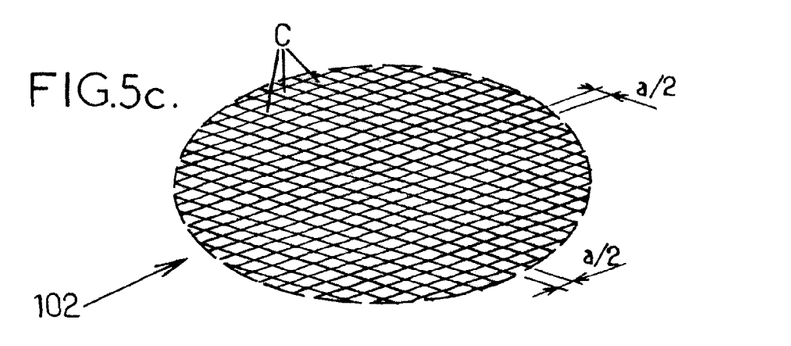

By way of comparison, in order to illustrate the benefits of the invention, FIGS. 5b and 5c show two reference optical elements 101 and 102, respectively, each comprising a single layer of square tilings reproducing the optical phase shift distribution of the convergent unifocal lens with a 1 m focal length. Production of these two reference optical elements 101 and 102, which do not employ the invention, also uses the same digital technology as was used for the element 100 in FIG. 5a to adjust the optical phase shift in each cell C.

The pitch of the square tiling of element 101 in FIG. 5b is equal to a, i.e. identical to that of each of the layers 1, 2 of the element 100 in FIG. 5a. The pitch of the square tiling of element 102 in FIG. 5c is equal to a/2. The diameters of the three elements 100, 101 and 102 are identical.

Under these conditions, the optical phase shift produced by each cell C of the reference element 101 may be double that produced by the same cell for a single of the layers of the element 100 according to the invention. Furthermore, the discrete optical phase shift values that are produced by the cells C of the reference element 102 reproduce, with less discretization error than the reference element 101, the continuous optical phase shift distribution of the convergent lens of 1 m focal length used as a target for these three elements.

The three elements 100, 101 and 102 may then be compared in an equivalent manner either by implementing actual optical experiments, or via numerical simulations of such experiments. Such simulations, which were carried out in the present case, are based on optical Fourier calculations. It is assumed that the principle behind such calculations is known to those skilled in the art and that hence there is no need to describe it here.

First, the optical functions of the three elements 100, 101 and 102 were compared, using the first method presented above, by illuminating each of them with a beam of parallel monochromatic light with a wavelength of 633 nm (nanometers) parallel to their respective optical axes. The luminous illumination produced in the image focal plane of each of them, located 1 m downstream of each element, was then recorded. The maximum intensities of the secondary diffraction peaks were −24.3 dB (decibels) for the elements 100 and 102, and −18.1 dB for the element 101, these intensities being measured relative to that of the geometric image point, which is located where the optical axis intersects the image focal plane. Thus, although the pitch of each of the layers of the element 100 according to the invention is double that of the reference element 102, the parasitic diffractions that were produced by these two optical elements have comparable intensities that are lower than that of the reference element 101. Furthermore, the angle between the first order diffraction direction and the optical axis is two times larger for the elements 100 and 102 than for the element 101.

The optical functions of the two elements 100 (FIGS. 5a) and 101 (FIG. 5b) were also compared by adhesively bonding each of them to a divergent unifocal lens having a focal length equal to −1 m. This divergent lens was produced in the conventional way by continuously varying its thickness, in order to observe effects associated with the digital elements 100 and 101. Refractive effects observed for the doublets obtained in this way correspond to defects in the digital elements 100 and 101. Thus, a luminous pattern located at infinity, for example a Landolt C of outside angular diameter equal to 2.96° (degrees) and of angular stroke thickness equal to 0.74°, is observed through each of the doublets. Observing the pattern through the doublet containing the element 100 caused parasitic images to appear that were aligned parallel to the directions of the tilings, but the space between these parasitic images is two times larger for the element 100 according to the invention than for the reference element 101.

The pattern was observed in the same way with a second element according to the invention, which element consisted of four layers again comprising square tilings, of pitch equal to a, these tilings however being progressively offset by multiples of a quarter of the length of the diagonal of the cells. The optical phase shift distribution in each layer of this second element reproduced that of a convergent lens with a focal length equal to 4 m. This second element according to the invention therefore also formed a digital version of a convergent lens with a focal length equal to 1 m. Observing the Landolt C through the new doublet formed by adhesively bonding the second four-layer element to the divergent lens of −1 m focal length showed that the space between the parasitic images was also twice as large as for the element 100. Therefore, increasing the number of layers in a transparent optical element according to the invention makes it possible to improve the optical function thereof.

Furthermore, if the two layers 1 and 2 were offset within the element 100 by a length a/4 in the two directions of the sides of the square cells C, instead of by a/2, the maximum intensity of the secondary diffraction peaks became −23.1 dB. Therefore, although the benefit of the invention is maximized for the element 100 when the translation length is equal to half the pitch a, a significant improvement is also obtained for other values of the translation length lying between 25% and 75% of the pitch a.

Figure 6:
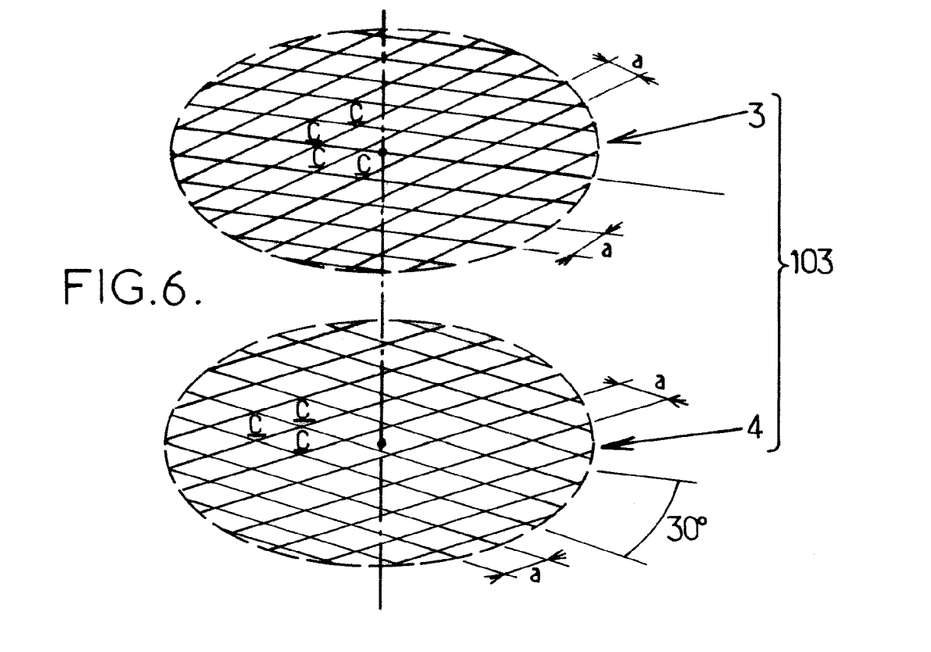
FIGS. 6 and 7 illustrate two other embodiments of the invention.

As shown in FIG. 6, a third transparent optical element 103, according to the invention, comprises two layers 3 and 4 again comprising square tilings of pitch a for example equal to 200 μm. The two layers 3 and 4 are identical to the layer 1 of the element 100. They therefore each possess an optical phase shift distribution that corresponds to a convergent lens with a focal length equal to 2 m. The two layers 3 and 4 are superposed in the element 103 but rotated by 30° one relative to the other about their common optical axis D. The element 103 therefore also has a convergent lens function with a focal length of 1 m.

The illumination obtained in the image focal plane of the element 103 1 m downstream of this element, when it was illuminated by a beam of parallel monochromatic light of 633 nm wavelength, contained secondary diffraction peaks that had maximum amplitudes equal to −24.2 dB. The advantage conferred to the element 103 by the invention is therefore analogous to that conferred to the element 100. In other words, the element 100 would be little degraded by an error in the angular alignment of the two layers 1 and 2.

Observing the Landolt C through the element 103 adhesively bonded to the divergent lens of −1 m focal length caused parasitic images to appear that were much less bright than those visible with the element 102, under the same illumination and observation conditions.

Figure 7:
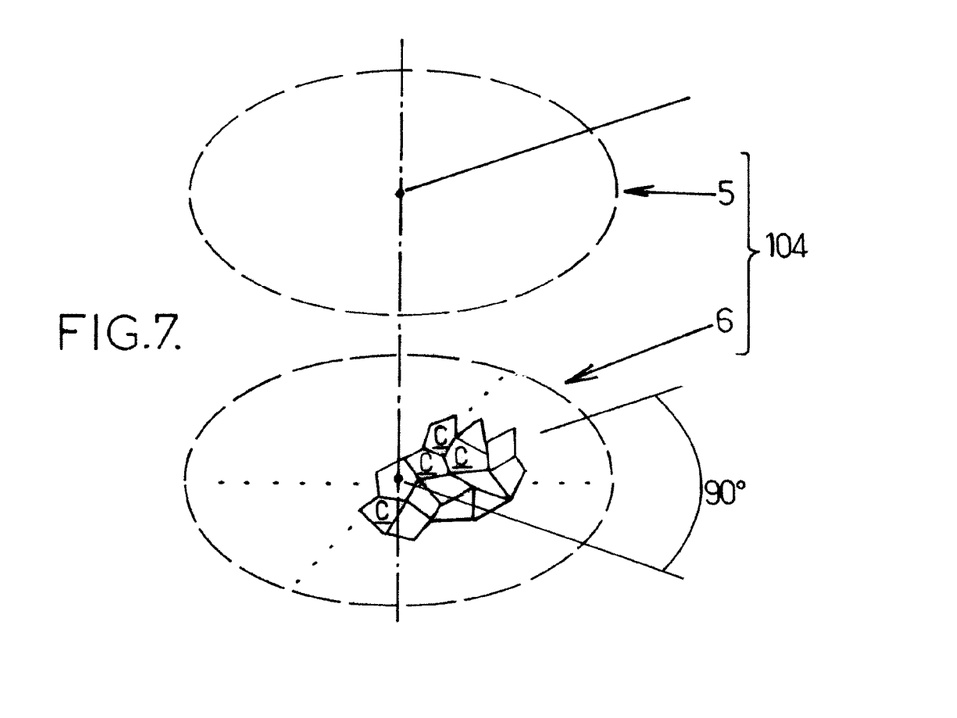

As shown in FIG. 7, a fourth transparent optical element 104 according to the invention consists of two layers 5 and 6 comprising identical tilings that are rotated, one relative to the other, by 90° about the optical axis of the element D. The common tiling of the two layers 5 and 6 is pseudo-random. It was obtained from the tiling in the layer 1 described above by randomly shifting the centers of the cells C, then by constructing the intercellular boundaries using the Voronoï method. The optical phase shifts obtained in the cells C thus defined were again selected to reproduce a convergent lens with a focal length equal to 2 m.

A reference optical element, which did not employ the invention, was formed from a single layer having the same pseudo-random tiling as each of the layers 5 and 6, but with an optical phase shift value in each cell C that was doubled relative to the value in the equivalent cell in one of these layers.

The optical element 104 and the latter reference element therefore again both have refractive functions that are similar to that of a convergent lens with a focal length equal to 1 m. When these two elements are illuminated by a beam of parallel light, the element 104 produces, in the image focal plane, a halo of scattered light that is more attenuated than is the case for the reference element. Thus, even in the case of random tilings, the invention allows drawbacks due to the digital nature of the element to be reduced.

Moreover, in an optical element according to the invention, the optical phase shift values of superposed cells belonging to the different layers add to one another. As a result, the width of the range of values accessible for the total phase shift is equal to the sum of the respective widths of the ranges of phase shift values accessible for each layer. Thus, an optical element according to the invention may possess apparent variations in optical phase shift that are greater than those of a single-layer element such as known from the prior art. Refractive functions that were not previously possible can thus be produced using the invention.

In particular, the greater variations in optical phase shift that are obtainable in an optical element according to the invention make it possible to avoid the need to implement small (despite the fact that they are multiples of two times pi) amplitude phase jumps. It is thus possible to use only phase jumps the amplitudes of which are greater than ten times pi, for example. Such large-amplitude phase jumps generate only a restricted chromatic aberration in the refractive function of the element, which chromatic aberration is compatible with many applications, especially ophthalmic applications.

It will be understood that the invention may be reproduced while modifying certain of its secondary aspects relative to the embodiments that were described in detail above. In particular, the following modifications may be applied, either separately or by combining a number of them together:

the superposed layers may be any number greater than or equal to two in number;

the various layers in a given optical element may have different tilings. For example, certain layers may have periodic tilings and others may have random or pseudo-random tilings;

the layers that are superposed in an optical element according to the invention may be adhesively bonded to one another or separated by intermediate spaces or intermediate films arranged between two successive layers; and the target values for the phase shifts that are produced by two layers of a given optical element may be different. Therefore, the respective phase shift distribution functions of the layers may also be different.

The invention claimed is:

1. A transparent optical element, comprising:
a plurality of layers superposed along an optical axis of the element,
each layer extending perpendicularly to the optical axis formed from a tiling of contiguous cells, with a distribution function of an optical phase shift in each layer having a constant value inside each cell of said layer,
neighboring cells in each layer being separated by a wall that extends perpendicularly to said layer,
a refractive function of the element resulting from a combination of the respective optical phase shift distribution functions of the layers, the optical phase shift being obtained by at least one of a variation in thickness or by variations in refractive index of transparent materials contained in the cells,
wherein the tilings of at least two of the layers do not coincide in a projection of said layers onto a surface perpendicular to the optical axis, so that the boundaries between some of the contiguous cells of one of the two layers cut some cells of the other of the two layers in said projection, and
the element is adapted to form an image of a scene from the light originating from said scene and passing through said element.

2. A transparent optical element adapted to form an image of a scene from the light originating from said scene and passing through said element, said element comprising:
a plurality of layers superposed along an optical axis of the element,
each layer extending perpendicularly to the optical axis formed from a tiling of contiguous cells, with a distribution function of an optical phase shift in each layer having a constant value inside each cell of said layer,
neighboring cells in each layer being separated by a wall that extends perpendicularly to said layer,
a refractive function of the element resulting from a combination of the respective optical phase shift distribution functions of the layers,
wherein the tilings of at least two of the layers do not coincide in a projection of said layers onto a surface perpendicular to the optical axis, so that the boundaries between some of the contiguous cells of one of the two layers cut some cells of the other of the two layers in said projection.

3. The element as claimed in claim 2, forming an optical lens.

4. The element as claimed in claim 3, forming an ophthalmic lens.

5. The element as claimed in claim 2, in which the refractive function of the element is invariant in rotation about the optical axis of said element, except for residual variations due to a discretization of the values of the optical phase shift distribution functions.

6. The element as claimed in claim 5, in which the respective tilings of said at least two layers which do not coincide on the projection surface, are identical but offset one relative to the other by a translation, by a rotation, or by a combination of a translation and a rotation.

7. The element as claimed in claim 2, in which the respective tilings of said at least two layers, which do not coincide on the projection surface, are identical but offset one relative to the other by a translation, by a rotation, or by a combination of a translation and a rotation.

8. The element as claimed in claim 7, in which the respective optical phase shift distribution functions of the layers having identical tilings are themselves identical except for the respective translations or rotations or combinations of translations and rotations of said layers.

9. The element as claimed in claim 7, in which at least one of the respective tilings of said at least two layers, which do not coincide on the projection surface, is random or pseudo-random.

10. The element as claimed in claim 9, in which the respective optical phase shift distribution functions of the layers having identical tilings are themselves identical except for the respective translations or rotations or combinations of translations and rotations of said layers.

11. The element as claimed in claim 7, in which N of the layers of the element have respective tilings that are identical but each of which is offset relative to one of the N tilings taken as a reference by a translation or by a combination of a translation and a rotation, N being an integer number greater than or equal to two,
and in which the respective tilings of said N layers are each periodic with a common period a in at least one period direction associated with each layer,
and in which a length of the translation of the tiling of each of said N layers relative to the reference tiling, in the period direction of said reference tiling, lies between 25% and 75% of i·a/N in addition to an integer number of times said common period, where i is a natural integer numbering the N layers having identical tilings, with i ranging from 0 to N-1 and i being zero for the layer of the reference tiling.

12. The element as claimed in claim 11, in which the respective optical phase shift distribution functions of the layers having identical tilings are themselves identical except for the respective translations or rotations or combinations of translations and rotations of said layers.

13. The element as claimed in claim 11, in which the tiling period common to the layers having identical tilings lies between 3 μm and 1 mm.

14. The element as claimed in claim 7, in which the respective tilings of two of the layers, which do not coincide on the projection surface, are offset one relative to the other by a translation or by a combination of a translation and a rotation,
and in which each tiling of said two layers is periodic with a common period in at least one period direction associated with each layer,
and in which a length of the translation in the period direction of one of the two layers lies between 25% and 75% of the common period, in addition to an integer number of times said common period.

15. The element as claimed in claim 14, in which the respective optical phase shift distribution functions of the layers having identical tilings are themselves identical except for the respective translations or rotations or combinations of translations and rotations of said layers.

16. The element as claimed in claim 14, in which the tiling period common to the layers having identical tilings lies between 3 μm and 1 mm.

17. The element as claimed in claim 16, in which the respective optical phase shift distribution functions of the layers having identical tilings are themselves identical except for the respective translations or rotations or combinations of translations and rotations of said layers.

18. The element as claimed in claim 14, in which the length of the translation in the period direction of one of the two layers lies between 25% and 75% of the common period.

19. The element as claimed in claim 18, in which the respective optical phase shift distribution functions of the layers having identical tilings are themselves identical except for the respective translations or rotations or combinations of translations and rotations of said layers.

20. The element as claimed in claim 18, in which the tiling period common to the layers having identical tilings lies between 3 μm and 1 mm.

* * * * *